June 14, 1966  E. E. BAUMAN  3,256,462
CONTROL SYSTEM FOR INDICATOR TUBES
Filed June 6, 1961  3 Sheets-Sheet 1
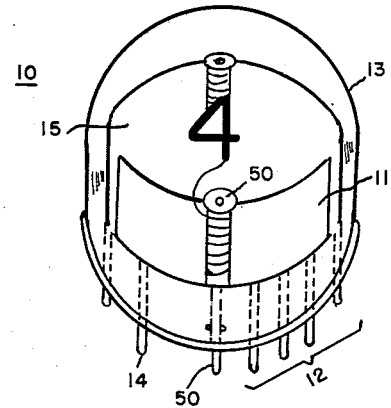
FIG. I
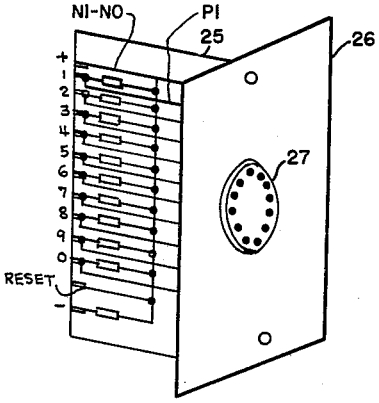
FIG. II
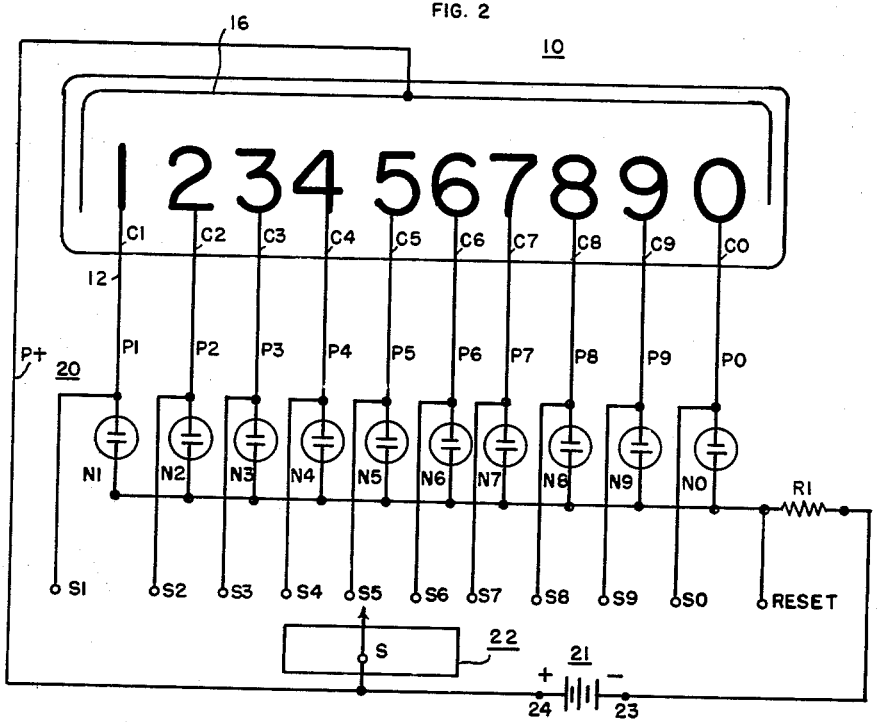
FIG. 2
*INVENTOR.*
EDWARD E. BAUMAN
BY June 14, 1966   E. E. BAUMAN   3,256,462
CONTROL SYSTEM FOR INDICATOR TUBES
Filed June 6, 1961   3 Sheets-Sheet 2

INVENTOR.
EDWARD E. BAUMAN

June 14, 1966　　　　　E. E. BAUMAN　　　　　3,256,462
CONTROL SYSTEM FOR INDICATOR TUBES
Filed June 6, 1961　　　　　　　　　　　　　　3 Sheets-Sheet 3

INVENTOR
EDWARD E. BAUMAN

United States Patent Office 3,256,462
Patented June 14, 1966

3,256,462
CONTROL SYSTEM FOR INDICATOR TUBES
Edward E. Bauman, Polk Township, Crawford County, Ohio, assignor to North Electric Company, Galion, Ohio, a corporation of Ohio
Filed June 6, 1961, Ser. No. 115,263
13 Claims. (Cl. 315—131)

The present invention is directed to a novel memory device for use in the control of indicator means.

The reliability and convenience inherent in the transmission of speech, data, information and other forms of intelligence as electrical waves, signals or pulses has long been recognized in the art, and particularly in the fields of telephony, telegraphy, television and other well known branches of the communication art. In recent years there has been an increasing trend toward the use of such electrical signals in accomplishing computing functions such as in data processing equipment, electronic test equipment, and the like. The utility of the signals as thus used is, of course, measured by the ability to ascertain or interpret the nature of the information which is represented by the signals, and as a result the different forms of equipment must necessarily include means for converting the information represented by the signals into a form which is recognizable by the user. To this end the equipment normally includes a display means, such as a display tube, indicator tube, tape recorder, punch recorder, etc., and a readout circuit for converting the information-bearing signals into signals which are capable of operating the associated display or indicating means.

One successful type of indicator tube now commercially available in the field from the Burroughs Corporation, Plainfield, New Jersey is particularly well suited for use in the display of signal information provided by the control circuits in many types of electronic equipment. In one embodiment of such indicator tube, for example, ten display digits 1–0 are arranged in superposed relation with each other within a gas tube having a transparent housing, and ten separate leads are provided externally of the tube to permit selective energization of any one of the digits mounted therein. It is apparent that such tubes may be used in groups to display large numbers, or if preferred, the tube may be connected to display other forms of symbols, such as letters, characters, plus and minus signs, and the like. Manifestly the range of the displays which may be achieved with such type indicator tube is extremely wide.

In the use of an indicator tube of such type in the field, however, it has been found extremely difficult to provide a low-cost, reliable control circuit which is capable of converting the information-bearing signals provided by the electronic equipment into signals which are capable of controlling the operation of the indicator tube. That is, the information-bearing signals output from most types of electronic equipment are of a relatively low value and are normally of an extremely brief duration. Since the indicator tube requires signals in the order of 170 volts to effect energization of the display symbols on the tube, the signal obtained from the equipment is frequently not capable of directly controlling operation of the indicator tube. Further, since a display is provided only for the period that a signal is coupled to the indicator tube, and the signals output from electronic equipment are normally of a momentary nature, it is frequently necessary to provide a control circuit which includes a memory function for the purpose of maintaining the symbol energized after the signal from the electronic equipment is terminated, and in most instances until such time as the existing display is removed for the purpose of providing a different display.

In one type of control circuit now known in the field, for example, ten medium voltage NPN transistors are connected in a common emitter configuration, the collector of each transistor being connected to control a different one of the ten symbols of the tube whenever a low voltage information representative signal is applied to its base element. The energized transistor and the symbol controlled thereby remain energized for the period of application of the low voltage signal to the transistor. It is apparent that the use of ten medium or high voltage transistors to effect the control of a digit on an indicator tube is not inexpensive, and the cost in installations which must use a large number of such tubes and associated control circuits to provide indications of multi-digit numbers is obviously of a high order. The further requirement in such arrangement for a memory device for each indicator tube which is operative to maintain the selected transistor operative after the information representative signal received from the input equipment is terminated results in a system of high cost, which may, in fact, be prohibitive in smaller size indicator systems.

Other types of control system known in the field which have tube control and memory functions include decade type memory devices which use ten relays, two-out-of-five type memory devices which require five relays, and binary code type memory devices requiring four relays. Such arrangements are also somewhat expensive, require an increased amount of mounting space, and in certain applications, may have a much shorter longevity than the transistor type control. It is a particular object of the invention, therefore, to provide a simple, low cost, reliable control system which is also operative as a memory device in the control of an indicator tube.

It is a further object of the present invention to provide a novel memory device which is basically comprised of low cost, constant voltage reference devices, such as neon lamps, each of which is connected to control the selective operation of a different one of the display symbols in the indicator tube, and further to maintain the symbol energized until such time as a different one of the lamps is ionized to energize a different one of the display symbols.

It is a further object of the invention to provide a low cost, plug-in adapter unit of reduced size which may be readily intercoupled between the source of information-bearing signals and the indicator tube to control operation of the indicator tube and simultaneously provide a memory function.

It is a specific object of the invention to provide a control circuit for a first gaseous tube which has a control gap which ionizes in response to the coupling of a potential of a predetermined value across the control elements thereof and which is sustained at a lower voltage, a second gaseous tube connected in series with the control gap of said first gaseous tube which ionizes in response to the coupling of a potential of a predetermined value across the control elements thereof, and which sustains at a lower value, means for coupling a voltage across said first and second gaseous tubes in series which is of a value less than the sum of the breakdown voltages of the two tubes, and which is of a value in excess of the sum of the sustaining voltage of one of the tubes and the ionization voltage of the other one of the tubes, and means for selectively coupling and removing a breakdown voltage across said second tube alone.

These and other advantages of the present invention will become apparent with reference to the following specification and accompanying drawings, wherein basic embodiments of the structure are illustrated, and in which:

FIGURE 1 is a perspective illustration of an indicator tube of known construction;

FIGURE 2 is a schematic diagram of an indicator tube including a novel control circuit for use in the operation thereof;

FIGURE 11 is a perspective view of one form of a practical adapter unit including the novel control circuit for use with an indicator tube of the type shown in FIGURE 1.

GENERAL DESCRIPTION

Figure 3:
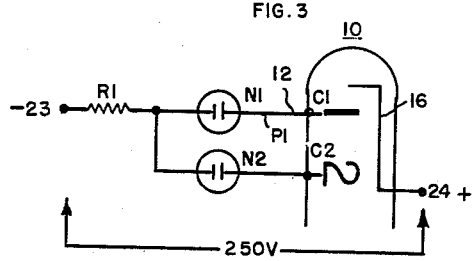
FIGURES 3-10 are partial schematic diagrams of the circuit shown in FIGURE 2 setting forth the manner of operation thereof.

One form of a commercially available gas filled indicator tube 10 for providing a display of digits 1-0 is shown in FIGURE 1, and as there shown basically comprises a base 11 from which ten pins 12 and one pin 14 depend vertically for connection to a tube energizing circuit, and a transparent envelope or dome housing 13 which is sealed to and mounted on the base 11 in a manner to permit viewing of the information presented on a display area 15 located on the upper side of the base 11. Digits or other indicia (one of which is shown in FIGURE 1) are arranged in superposed relation in the display area, and each is connected over an associated cathode C1-C0. One pin 14 is coupled within the tube to a common anode 16 which, as shown in the schematic showing of FIGURE 2, is supported common to the cathodes C1-C0 to provide a plurality of separate anode-cathode paths within the indicator tube 10. The electrical characteristics of the aforementioned commercially available indicator tube are:

Assured firing or ionization voltage _____volts___ 170
Minimum firing or ionization voltage _____volts___ 140
Sustaining voltage _____volts___ 130
Cathode current _____ma___ 1.5-3.0

With the connection of a potential in the order of 170 volts D.C. across the common anode 16 and one of the cathode elements C1-C0 of the tube 10 (pin 14 and a pin 12), the anode-cathode path for the symbol associated with the energized one of the cathodes will ionize to provide a display of the associated symbol.

The connections of the novel control circuit 20 to control an indicator tube 10 is shown in FIGURE 2, and as there shown, the control circuit 20 and indicator tube 10 are energized by a power source 21 (250 volts in the present example) having positive and negative terminals 23, 24, the positive terminal 24 in the present embodiment being identified as ground. The signal input means 22 for providing signals for display on the indicator tube 10 is shown as a simple make-break switch S for coupling ground signals to the input leads S1-S0 and the reset lead of the control system 20. However, since the marking of a selection lead merely consists of the momentary application of ground thereto, any of a number of well known switching devices including manual switches, semiconductors, mechanical switches, relays, tubes, and the like may obviously be used in the connection of information representative signals to the selection leads S1-S0 for the purpose of selectively energizing one of the digits on the associated indicator tube 10.

The novel control circuit basically includes ten neon lamps N1-N0, each of which is connected to an associated one of the cathode pins 12 of the indicator tube 10 and over a common resistor R1 to the negative terminal of the supply source 21. Each neon lamp N1-N0 as shown hereinafter thereby constitutes a control means for a different one of the display symbols.

Selection means for the different control lamps include a plurality of selection conductors S1-S0, each of which is connected to a different one of the neon lamps N1-N0 at the point of junction of the lamp with its associated cathode pin 12 for selective energization by switch means 22.

The electrical characteristics of each of the neon lamps N1-N0 are

Volts
Firing or ionization voltages _____ 170-200
Sustaining voltage _____ 70-75 and are commercially available from Signilite, Inc., Neptune, New Jersey, one such tube having characteristics similar to those set forth herein being available under code No. T2-27-1-WR-760.

CIRCUIT OPERATION

General

With the connection of the positive terminal of the supply source 21 (ground in the present example) to the positive supply conductor for the control circuit 20, and the connection of the negative terminal of the supply source 21 to the negative supply conductor of the control circuit 20, and the connection of the control circuit output conductors P+, P1-P0 to the pins 14 and 12 respectively of the indicator tube 10, as the signal input means 22 is operative to momentarily connect a ground signal to a selection lead, such as S1 (for a period which is in the order of 2 ms. in the disclosed arrangement), the neon lamp N1 will ionize, and as the signal is removed, the symbol associated with the ionized one of the lamps (digit 1 in the present example), will be energized to effect the display of the digit "1" on the display area 15 of the indicator tube 10. The novel control circuit 20 maintains the digits energized in such condition until such time as a further signal is coupled to a different one of the selector or read-in leads S1-S0 to effect the energization of a different one of the digits (or symbols), or alternatively until such time as a reset signal is connected to the reset lead to remove all information from control circuit 20 and the indicator tube 10.

SPECIFIC OPERATION

As an aid to the understanding of the specific operation of the circuitry, reference is now made to FIGURES 3-10, which set forth the details of operation of the novel control circuit 20 and the indicator tube 10 responsive to the receipt of different signals from the signal input means 22.

No digit stored in control system

It is initially assumed that there is no information stored on the control circuit 20 (and therefore no digit is displayed on the indicator tube 10), and further that the indicator tube 10 is energized by the control circuit 20 in the manner shown with positive potentials coupled to the common anode 16 of the indicator tube 10, and negative potential coupled over terminal 23 and resistance R1 to the common lead for each of the lamps N1-N0.

In such condition, as shown in FIGURE 3, 250 volts is connected across each of the anode-cathode paths in the tube and its associated control lamp, the path for digit 1 for example extending from the negative terminal 23 of source 21 over the common resistor R1, a neon lamp, such as N1, output terminal P1, pin 12, and the interconnected cathode for digit "1" of the indicator tube 10, the common anode 16 and pin 14 and the positive terminal P+ to the positive terminal 24 of the battery source 21. As noted above, in the case of the illustrated tube, each cathode-anode path in the indicator tube 10 requires 140-170 volts to effect the ionization thereof. Further, each of the neon lamps N1-N0 requires 170-200 volts to effect ionization, and therefore a total of a minimum of 310 volts (140+170 volts) will be required to effect energization of the elements in a digit energizing path which includes a neon lamp, such as N1, and its associated anode-cathode path in the indicator tube 10. Since the total voltage at the time of connection of the source 21 across the digit energizing path is only 250 volts (see FIGURE 3), it is apparent that none of the paths in the system will ionize.

*Connection of read-in signal to one of the selector leads S0–S9*

Assuming now that a signal is received by the signal input means 22 which requires the display of the digit 1 on the indicator tube 10, the signal input means 22 is operated to couple momentarily a positive potential signal (ground in the present example) to conductor S1 which is the selection or read-in lead for effecting energization and display of the digit 1 on the indicator tube 10.

Figure 4:
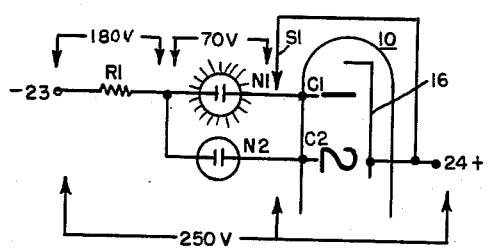

With reference to FIGURE 4, it is apparent that with the coupling of positive potential over lead S1, 250 volts will be connected across the neon tube N1 and resistor R1, and accordingly the neon lamp (which only requires an ionization voltage of 170–200 volts) will ionize. In that the signal applied by the signal input means 22 is at the same potential as the common anode 16 of indicator tube 10, there will be no potential difference across the associated anode-cathode path in the indicator tube 10, and such portion of the path remains in the deionized condition.

As shown in FIGURE 4, after the neon lamp N1 fires, the characteristics of the lamp are such as to require a sustaining voltage across the lamp N1 which is in the order of 70 volts. Since the remainder of the supply voltage (250 volts) must therefore now be developed across resistor R1 (which is in the order of 25K) the drop across resistor R1 will be 180 v. (250—70 v.) and 7.2 ma. will flow over the neon lamp N1 during the momentary period that the signal is connected to the selection conductor S1 by signal input means 22. The value of resistor R1 is purposely chosen so as to obtain a relatively high current flow and thereby increase the deionization time of the neon lamps (as energized), and particularly to provide a deionization period which is longer than the ionization period of any one of the cathode-anode paths in the indicator tube 10.

*Removal of read-in signal to energize digit*

Figure 5:
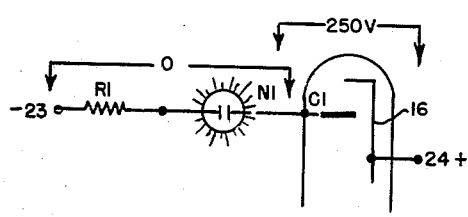

The momentary signal provided by signal input means 22 is now removed. With reference to FIGURE 5, it will be apparent that as the signal input means 22 (shown in FIGURE 2) removes the momentary read-in signal from selection conductor S1 (and recalling that the deionization time of each neon lamp N1–N0 is purposely elongated by coupling a current of increased value thereto), the neon lamp N1 in effect constitutes a device which provides a resistive path which extends from the negative terminal 23 of source 21 over resistance R1, neon lamp N1, the cathode-anode path for digit 1 in the indicator tube to the positive terminal 24 of potential source 21. As a result, the potential across the anode-cathode path for digit 1 in the indicator tube 10 will be 250 volts, which is greater than the assured ionization voltage of the path (170 volts), and such path will accordingly be ionized to complete an energizing circuit for digit 1 and thereby provide a display of the digit 1 on the indicator tube 10.

*Lock-up condition for energized digit*

The novel control circuit, as indicated above, is operative to maintain the energized one of the digits in such condition until such time as a further display signal is received over signal input means 22 or until such time as a reset signal is provided. In obtaining such memory action, it will be apparent with reference to FIGURE 6, that as the energizing path for digit 1 is ionized, the sustaining voltages in the energizing path will include a voltage drop of 50 volts across resistor R1, 70 volts across neon lamp N1 and 130 volt drop across the path from the cathode-anode path for digit 1 in the indicator tube 10.

The current flow in this circuit at this time is in the order of 2.0 ma. which has been indicated by the manufacturer of the indicator lamp as a value at which long life operation may be expected.

*Operation of control circuit to display a different digit*

Assuming now that it is desired to change the display of digit 1 on the indicator tube to the display of digit 2, the switch input means 22 is operated to couple a momentary read-in signal to selection conductor S2 to effect the energization of the digit energizing path for digit 2 including neon lamp N2 and the anode-cathode path 2 in the indicator tube 10. Simultaneously the energizing path for digit 1 is deionized.

Figure 6:
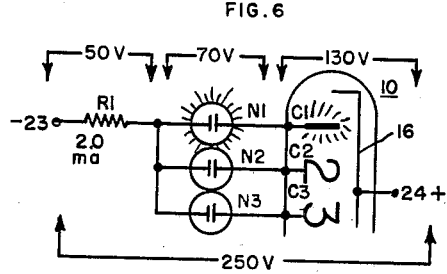

More specifically, with reference to FIGURE 6, it will be recalled that during the period of display of a digit on the indicator tube 10, the energizing circuit for the digit extends from the negative terminal 23 of source 21 over resistor R1, the neon lamp, such as N1, and the cathode-anode path for the illuminated digit 1 in the indicator tube 10 to the positive terminal 24 of source 21. At such time, the potential drop across resistor R1 is 50 volts, the drop across lamp N1 is 70 volts and the drop across the cathode-anode path for display digit 1 is 130 volts.

Figure 7:
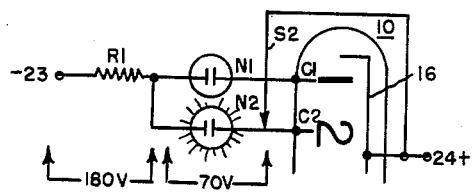
Figure 8:
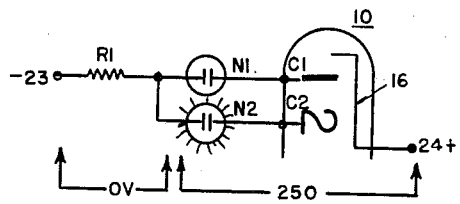

As the momentary signal for effecting the display of digit 2 is now coupled to selector terminal S2, it will be apparent with reference to FIGURE 7, that the voltage across neon lamp N2 is raised to 200 volts to effect the firing thereof, and as the lamp N2 is ionized, the voltage across neon lamp N1 and the cathode-anode path for digit 1 in the indicator tube is reduced to 70 volts. Since 70 volts is less than the sum of the minimum sustaining voltages for the cathode-anode path for digit 1 and neon lamp N1, the cathode-anode path for digit 1 in tube 10 and the neon lamp N1 both deionize. Neon lamp N2 remains ionized.

Figure 9:
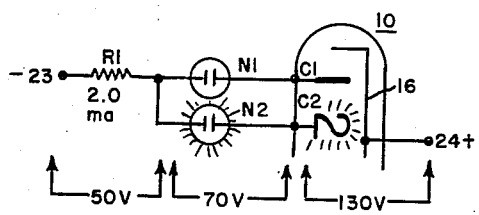

As the momentary read-in signal is removed from the selection conductor S2, the full 250 volts appears across the cathode-anode path for the digit 2 in the indicating tube 10 (FIG. 8), and the path ionizes in the manner set forth above to provide a display of digit 2. The path remains energized by reason of the voltages appearing thereacross as shown in FIGURE 9.

*Clearing of digits in indicator tube*

Figure 10:
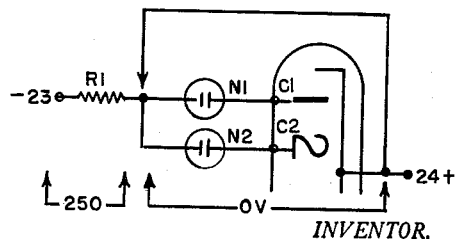

In the event that the digit display is to be cleared from the memory tube, a momentary signal (ground for approximately 2 milliseconds in the present example) is coupled by signal input means to the reset or clear lead. As shown in FIGURE 10, the voltage across each of the neon lamps N1–N0, as well as across the cathode-anode paths in the indicator tube 10, is reduced to zero to thereby deionize the paths in the control circuit 20 and indicator tube 10. As a result no further information is retained in the control circuit 20 or displayed upon the indicator tube 10.

STRUCTURE

It will be apparent to parties skilled in the art that the device is particularly well suited for manufacture by reason of its basic simplicity, and the ready manner in which the components lend themselves for use with modular construction. In one modular form shown in FIGURE 11, the connecting circuitry for the control system is printed on a modular support board 25 in accordance with well known techniques, and the ten neon lamps N1–N0 are soldered to the printed circuits in the manner and positions indicated. The resistor R1 utilized in the circuit can be mounted on the board 25 or mounted as an external component, and may be a printed resistor or a conventional resistor member which is soldered into position, as shown. A second board 26 mounted perpendicular to the support board 25 for the printed circuitry locates a tube socket 27 for the indicator tube 10, and conductors are connected between the circuits P1–P0 of the neon tubes N1–N0 and the corresponding ones of the cathode pins 12 for the indicator tube. A conductor also connects the positive potential path on board 25 to the anode 16 of the tube 10. Any one of a number of well known connection terminals may be incorporated on the board 25 for connecting the circuit with the signal input means 22 and the tube socket 27.

It will be further apparent that since the one of the neon lamps which is associated with the illuminated one of the display digits is also energized, the control circuit 20 may be mounted on a board 25 and a cover (not shown) which has numbered apertures corresponding to the location of the lamps N1–N0 on the printed circuit card is placed in superposed relation with the board, whereby the number displayed on the indicator tube will also be visually displayed by the control circuit. Thus, in applications in which it is desired to have a display at different points on the equipment, the novel control system may be used to provide a further display of the information.

Manifestly the use of a second cover plate of a similar construction for the opposite side of the board 25 will provide a display of the information on a third planar surface. An electronic readout of the information displayed may also be provided by connecting monitor leads across each of the neon lamps N1–N0, the presence of a 70 volts signal indicating that the digit is energized on the display, and the absence of said potential indicating that the digit is not energized or the monitoring can be done between the reset lead and any of the leads S1–S0 or between the supply conductor for the anode 16 and the different ones of the selector leads S1–S9.

Although the modular adapter unit is shown as incorporated on a flat support board it is apparent that the adapter unit may be as readily constructed for housing in a cylindrical container, or other forms of container structure without departing from the scope of the invention. It is further apparent that the control circuit may be expanded or reduced to operate in the same reliable manner with indicator tubes having any number of control paths.

SECOND EMBODIMENT

The basic structure of the invention is set forth in the novel control system hereinabove described, and a system including such apparatus will operate reliably whenever tube components having dependable operating characteristics are utilized. It has been found, however, that the small, economical neon lamp structures (N1–N0) as commercially purchased will occasionally momentarily extinguish and refire at a different point on the electrode, and in some cases a neon lamp of the type identified hereinabove will extinguish for a period sufficient to extinguish the corresponding anode-cathode path in the indicator tube 10. If the commercially available lamps are to be used in the circuit embodiment of FIGURE 1, it is advisable therefore to test the neon lamps (N1–N0) for the purpose of eliminating the particular ones of the lamps which "sputter" in such manner.

In some instances, the selection of suitable neon lamps, or the establishment of more strict purchasing specifications offers a satisfactory solution. However, in instances in which assembly line manufacturing is desired, the control system 20A set forth in FIGURE 12 may be used.

As there shown, the energizing path for each digit in an indicator tube 10 additionally comprises high value resistance means R31–R30 connected in parallel with the neon lamps N1–N0 respectively, and second resistance means R41–R40 connected in series with resistances R31–R30 and in parallel with the anode-cathode paths of the indicator tube 10.

In such arrangement the power supply voltage of source 21A is in the order of 300 volts, resistance R1 is in the order of 50K, resistances R31–R30 connected in parallel with the neon lamps N1–N0 are each in the order of 1.5 megohms, and resistances R41–R40 connected in parallel with the anode-cathode paths for digits 1–0 in the indicator tube are in the order of 1 megohm.

Operation

With the control system 20A and indicator tube 10 connected to the negative and positive terminals 23A, 24A of the 300 volt potential source 21A, and the system and the indicator tube 10 in the non-operated condition, 50 volts appears across the resistance R1 and 250 volts appears across each series path comprised of resistors, such as R31–R41, R32–R42, etc., the relative values of the resistances R31 and R41 being such that 150 volts appears across each of the neon lamps, such as N1 and 100 volts is impressed across each cathode-anode path in the indicator tube 10. The high resistance member, such as R31, connected in parallel with each of the neon lamps, such as N1, supplies current to the associated anode-cathode path in the indicator tube 10 after the neon lamp is fired, and such current maintains the path over the indicator tube energized even though the series neon lamp may momentarily break down.

In that the voltage drop across resistors, such as R31–R41, for each of the paths is of a stable value, the voltage at the junction of each neon tube, such as N1, and its associated anode-cathode path will be maintained at a predetermined closely controlled value, and as a result neon lamps and indicator tubes as commercially purchased, may be included in the control circuit without the need for special selection of lamps having preferred tolerance characteristics.

It has been further determined that the provision of an electrode to provide a minute amount of ionization at such times as no information is stored in the control system or in the indicator tube (at times at which each of the neon tubes and cathode-anode paths are extinguished), will result in a more uniform and expeditious ionization of the gaseous paths in a circuit as energized by an incoming signal.

Figure 12:
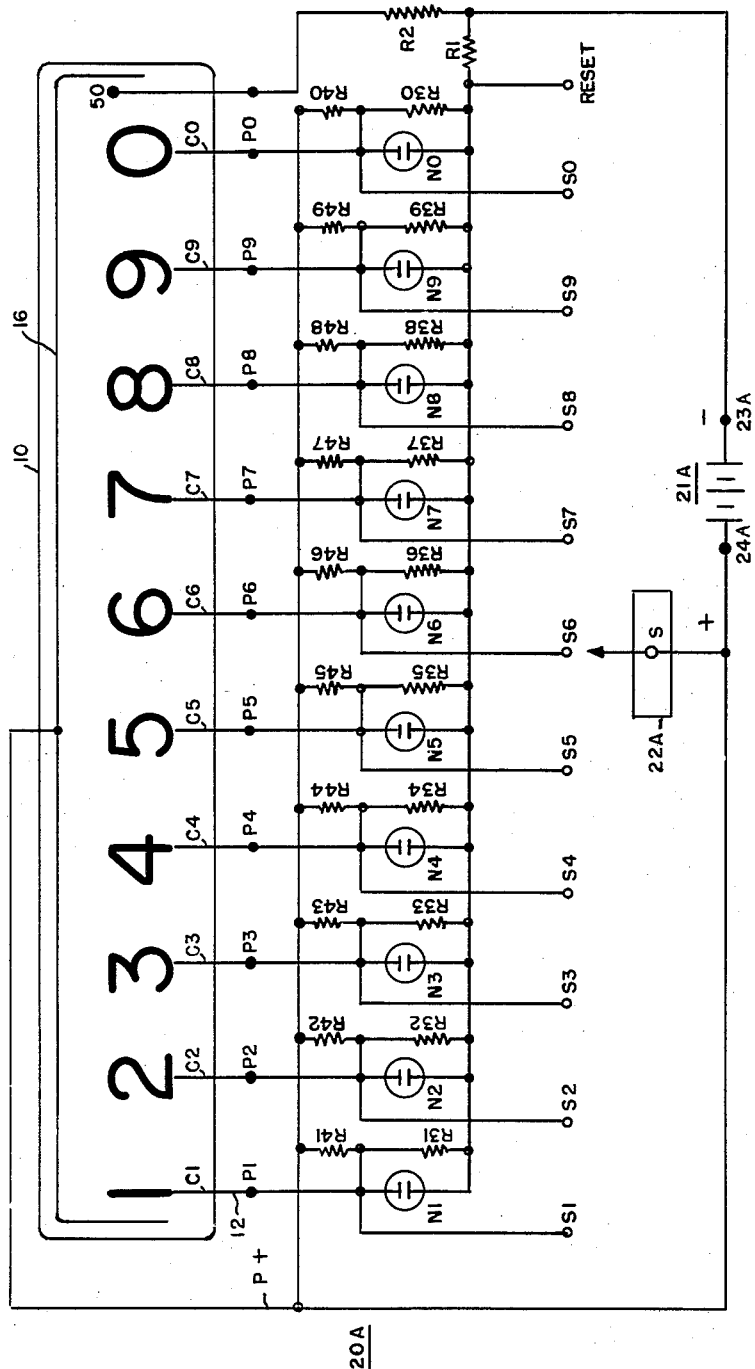
FIGURE 12 is a circuit diagram of an improved embodiment of the novel control system having stabilizing components.

It is apparent that a separate electrode may be provided in the indicator tube and an energizing path continually connected thereto will provide the minute ionization desired. Such arrangement is represented in FIGURE 12 by the illustrated electrode member 50 which is connected over resistor R2 (which is in the order of 44 megohms in the disclosed arrangement) to the negative terminal 23 of the potential source 21A.

In the indicator tube of the type identified in FIGURE 1, and hereinbefore in the specification, the indicator numerals are mechanically supported and aligned within the housing by two mechanical rods. In that each of the rods is electrically insulated from the numerical elements, and extends downwardly and outwardly of the tube housing to a mounting pin, resistor R20 may be connected between one of the mounting pins and the negative terminal 23 of the potential source 21A. In practice, the minute ionization provided by such pin as energized resulted in a more uniform and expeditious ionization of the individual gaps in the indicator tube 10.

Conclusion

The novel control system of the present disclosure comprises a practical, low cost, reliable means for controlling indicator devices in the display of information represented by low value, short duration signals. The simplicity of the device results in increased reliability, and a structure of long life in field use. Further, the low power requirements and small number of component parts considerably simplify the space and mounting problems which are normally incident to the use of display equipment and as shown hereinbefore permit an unlimited number of packaging arrangements.

Although only certain particular embodiments of the invention have been shown and described, it is apparent that modifications and alterations may be made therein, and it is intended in the appended claims to cover all such modifications and alterations as may fall within the true spirit and scope of the invention.

What is claimed is:

1. In a control circuit for a first gaseous tube having a plurality of control paths, a plurality of gaseous control tubes, each of which is connected in series with a different one of the control paths of said first gaseous tube, selection means operative to selectively apply and remove a breakdown voltage to each control tube separately from the other ones of the control tubes to thereby provide for separate ionization of each of said control tubes, and supply means for selectively coupling a potential across each energizing path which includes a control path of said first tube and a gaseous control tube in series, said potential being of a value in excess of the sum of the sustaining voltage for the control tube and the ionization voltage of the control path in said energizing path to thereby ionize the control tube and the control path in series responsive to removal of the breakdown voltage from the control tube, and means for connecting each of said gaseous control tubes to shunt the potential across the other gaseous devices and their associated circuits to a deionizing value responsive to the coupling of said breakdown voltage to a gaseous control tube.

2. In a control circuit for gaseous indicator tube having a plurality of control paths, each of which ionizes to display a different symbol in response to the coupling of a potential of a predetermined value across the elements in its path and is sustained at a lower voltage, a plurality of gaseous tubes, each of which is connected in series with a different one of said control paths, and each of which ionizes in response to the coupling of a potential of a predetermined value across the control elements thereof and sustains at a lower value, means for coupling a given potential across each control path in said tube and its associated gaseous device in series, which potential is of a value less than the sum of the breakdown voltages of the control path and its associated gaseous device, and which is of a value in excess of the ionization voltage of the control path and the sustaining voltage of its associated gaseous device, and means for selectively coupling a breakdown voltage across any one of said gaseous devices to ionize same without effecting ionization of its associated control path and others of said gaseous devices, and for removing said breakdown voltage to maintain only said one gaseous device energized and to simultaneously effect ionization of its associated control path.

3. A control circuit as set forth in claim 2 which includes means connecting each of said gaseous devices to shunt the potential across the other gaseous devices and their associated circuits in the system to a deionizing value responsive to the coupling of said breakdown voltage to a gaseous device.

4. A control circuit as set forth in claim 2 which includes a common circuit connected to one control element of each of said gaseous tubes, and means for coupling a reset signal to said circuit to effect deionization of each gaseous tube in said circuit and each control path in said indicator tube.

5. In a control circuit for coupling an energizing potential from a potential source to a gaseous indicator tube which is operative to display a symbol responsive to the application of a potential across a pair of control elements for the tube, means for coupling a potential of a first value to one of said control elements, a resistor member having one end coupled to a potential of a second value, a constant voltage reference device connected between the second end of said resistor and the second one of said control elements, and selection means coupled to the connection of said constant voltage reference device and said second control element, including means for selectively applying a potential of a value to said selection means to effect ionization of said constant voltage device, and for selectively interrupting the application of said potential to said constant voltage device to effect ionization of the path across said control elements in series with said constant voltage device.

6. In a control circuit for coupling an energizing potential from a potential source to a gaseous indicator device which is operative to display a symbol responsive to the application of a potential across a pair of associated control elements, means for coupling a potential of a first value to one of said control elements, a resistor member having one end coupled to a potential of a second value, said resistor member being of a value to increase the deionization time of the constant voltage device to a value substantially in excess of the ionization time for the path across the control element for the indicator device, a gaseous constant voltage reference device connected between the other end of said resistor and the other of said control elements, and selection means coupled to the connection of said constant voltage reference device and said second control element, including means for selectively applying a potential of said first value to said selection means to effect ionization of said constant voltage device, and for selectively interrupting the application of said potential to effect ionization of the path across said control elements in series with said constant voltage device.

7. An adapter device for controlling the application of operating signals and potentials to a gaseous indicator device which is operative to display different symbols responsive to the application of a potential across different control elements thereon, said adapter device comprising a supporting structure, a plurality of constant voltage reference devices supported by said structure, each of which has at least a first and a second control element, a plurality of read-in terminals for receiving signals representative of the symbol to be displayed on said device, each input terminal being disposed to represent a different symbol, selection means for each constant voltage reference device, each of which couples each different one of said input circuits to the first control element on a different one of said constant voltage reference devices, means coupling said second element of each of said constant voltage reference devices to a common one of said input terminals, and a plurality of output circuits, each of which is coupled to said one element of each of said constant voltage reference device tubes to permit connecting of each of said elements to a different control element on said indicator device.

8. An adapter device for controlling the application of operating signals and potentials to a gaseous indicator device which is operative to display different symbols responsive to the application of a potential across different control elements on the device, said adapter device comprising a supporting structure, a plurality of constant voltage reference devices supported by said structure, each of which has at least a first and a second control element, a plurality of read-in terminals for receiving signals representative of the symbol to be displayed on said device, each input terminal being disposed to represent a different symbol, selection means for each constant voltage reference device, each of which couples a different one of said input circuits to the first control element on a different one of said constant voltage reference devices, resistor means, common coupling said second element of each of said constant voltage reference devices over said resistor means to a common one of said input terminals, and a plurality of output circuits, each of which is coupled to said one element of each of said constant voltage reference device tubes to permit connecting of each of said elements to a different control element on said indicator device.

9. An adapter device as set forth in claim 8 which includes reset means for coupling reset signals to said common means prior to its connection to said resistor member.

10. In a control circuit for a first gaseous tube having a control grap which ionizes in response to the coupling of a potential of a predetermined value across the control elements thereof and is sustained at a lower voltage, a second gaseous tube connected in series with said first gaseous tube which ionizes in response to the coupling of a potential of a predetermined value across the control elements thereof and sustains at a lower value, means for coupling a voltage across said first and second gaseous tubes in series which is of a value less than the sum of the breakdown voltages of the two tubes, and which is of a value in excess of the sum of the sustaining voltage of one of the tubes and the ionization voltage of the other one of the tubes, means for selectively coupling and removing a breakdown voltage across said one tube only to effect series operation of said second gaseous tube and the control gap of said first tube, and resistance means connecterd in shunt of said second gaseous tube of a value to provide a current flow for sustaining said control gap responsive to interruption of the path over said second gaseous tube alone.

11. An arrangement as set forth in claim 10 which further includes a resistance means connected in shunt of said control elements to provide a stable voltage at the point of connection of said second gaseous tube with the path which extends over said control gap of said first gaseous tube.

12. In a control circuit for a first gaseous tube having a control path, an electrode for effecting preionization of the gas within said tube, means for coupling said electrode to a source of potential to effect ionization adjacent said electrode preliminary to energization of said control path, a second gaseous tube connected in series with the control path of said first gaseous tube, selection means for selectively applying a breakdown voltage across only said second tube to ionize said second tube alone, and supply means for coupling a voltage across the control path of said first tube and the second tube in series which is of a value in excess of the sum of the sustaining voltage for said second tube and the ionization voltage of the control path for said first tube to thereby ionize both tubes in series responsive to removal of the breakdown voltage from said one tube by said selection means.

13. In a control circuit for a first gaseous tube having a control gap which ionizes in response to the coupling of a potential of a predetermined value across the control elements thereof and which is sustained at a lower voltage, a second gaseous tube connected in series with said first gaseous tube which ionizes in response to the coupling of a potential of a predetermined value across the control elements thereof and sustains at a lower value, means for coupling a voltage across said first and second gaseous tubes in series which is of a value less than the sum of the breakdown voltages of the two tubes, and which is of a value in excess of the sum of the sustaining voltage of one of the tubes and the ionization voltage of the other one of the tubes, means for selectively coupling and removing a breakdown voltage across only one of said tubes to effect operation of both tubes in series, and electrical readout means connected across one of said gaseous tubes to provide an electrical signal for indicating the energized and nonenergized condition o fthe energizing path including said first and second tubes.

References Cited by the Examiner

UNITED STATES PATENTS

| 2,021,034 | 11/1935 | Thompson | 315—188 X |
| 2,423,031 | 6/1947 | Kurtz et al. | 315—187 X |
| 2,492,850 | 12/1949 | De Mers | 315—188 X |
| 3,032,686 | 5/1962 | Mathis | 315—189 |
| 3,183,404 | 5/1965 | Kitz et al. | 315—84.5 |

FOREIGN PATENTS 865,620  4/1961  Great Britain.

GEORGE N. WESTBY, *Primary Examiner.*
JOHN W. HUCKERT, C. R. CAMPBELL,
*Assistant Examiners.*